(12) United States Patent
Roger (10) Patent No.: US 7,322,631 B2
(45) Date of Patent: Jan. 29, 2008

(54) DASHBOARD SHADER

(76) Inventor: Jessey Roger, PO Box 361, Secane, PA (US) 19018

( * ) Notice: Subject to any disclaimer, the term of this patent is extended or adjusted under 35 U.S.C. 154(b) by 99 days.

(21) Appl. No.: 11/407,214

(22) Filed: Apr. 20, 2006

(65) Prior Publication Data

US 2006/0192405 A1    Aug. 31, 2006

Related U.S. Application Data

(63) Continuation-in-part of application No. 10/948,340, filed on Sep. 24, 2004, now abandoned.

(51) Int. Cl.
*B60J 3/02* (2006.01)
(52) U.S. Cl. ............. 296/97.7; 296/97.4; 296/97.8
(58) Field of Classification Search ......... 296/97.4, 296/97.7, 97.8, 136.03, 143, 138, 80, 81; 160/DIG. 3
See application file for complete search history.

(56) References Cited

FOREIGN PATENT DOCUMENTS

| DE | 4420482   | 12/1995 |
|----|-----------|---------|
| EP | 001400392 | 3/2004  |
| JP | 407246859 | 9/1995  |

OTHER PUBLICATIONS http://en.wikipedia.org/wick/Barrel_vault, Wikipedia website for "Barrel Vault", 5 pages, dated Jul. 27, 2007.

*Primary Examiner*—Dennis H. Pedder
(74) *Attorney, Agent, or Firm*—Edward F. Behm, Jr.

(57) ABSTRACT

A system designed to provide shade for the driver and the front passenger in an automobile. Shades can be flipped up and either pulled out or power driven out to provide shade. Any suitable shapes and materials may be employed for the shades. In an alternative embodiment a shade is inflated and clipped on.

10 Claims, 11 Drawing Sheets

DASHBOARD SHADER

CROSS-REFERENCE TO RELATED APPLICATIONS

The present application is a continuation-in-part of application Ser. No. 10/948,340, filed on Sep. 24, 2004, now abandoned, herein incorporated by reference in its entirety, and from which priority is claimed as to the subject matter disclosed therein.

BACKGROUND OF THE INVENTION

1. Field of the Invention

The invention relates to shades. More particularly, the invention relates to a dashboard shade that may be implemented as a flip up, manually pulled out or mechanically driven out shade, on or in an automobile dashboard.

2. Discussion of the Background

There are many types of shades on the market: window shades, door shades, hats, caps to car overhead shades which are designed to cover from sunlight.

The sunshade of the present invention provides shade for the driver and for the front passenger when needed.

An advantage of the present invention is that the shade stays flat and can be pushed in or driven in so that the front end of the shade sits flat to the dashboard surface, hence the design of the dashboard looks the same way it was designed to look without the shade.

An additional advantage of the present invention is that when the shader is flipped up or slid out for shade, it will have less angle to its vertical than a normal dashboard angle to its vertical which helps the head sunlight heat to throw (reflect) back out rather than reflecting in towards the driver.

Another advantage of the present invention is that it helps the air conditioner to work more efficiently on hot days.

Another advantage of the present invention is that it prevents the driver's and front passenger's hands from becoming sunburned.

And, this shader can be modified and slid up from inside of the front doors for shade.

DETAILED DESCRIPTION

A more complete understanding of the present invention may be derived from the detailed description and claims when considered in connection with the several views where like reference numerals represent similar items throughout the figures.

Throughout the several views, 1 is the vehicle dashboard; 6 is a driven member that may comprise a gear shaft or rack; 8 represents drive members that may be gear wheels or pinions; and 7 is an electric motor.

Each shader is pivotally attached to a driven member 6 and is mounted either on or in the dashboard 1. In operation, the shader is either pulled or driven out and may also be flipped up. In a power driven embodiment, motor 7 drives gear shaft or rack 6 via gear wheels or pinions 8. Any suitable shapes and materials may be employed for the shades.

Figure 1:
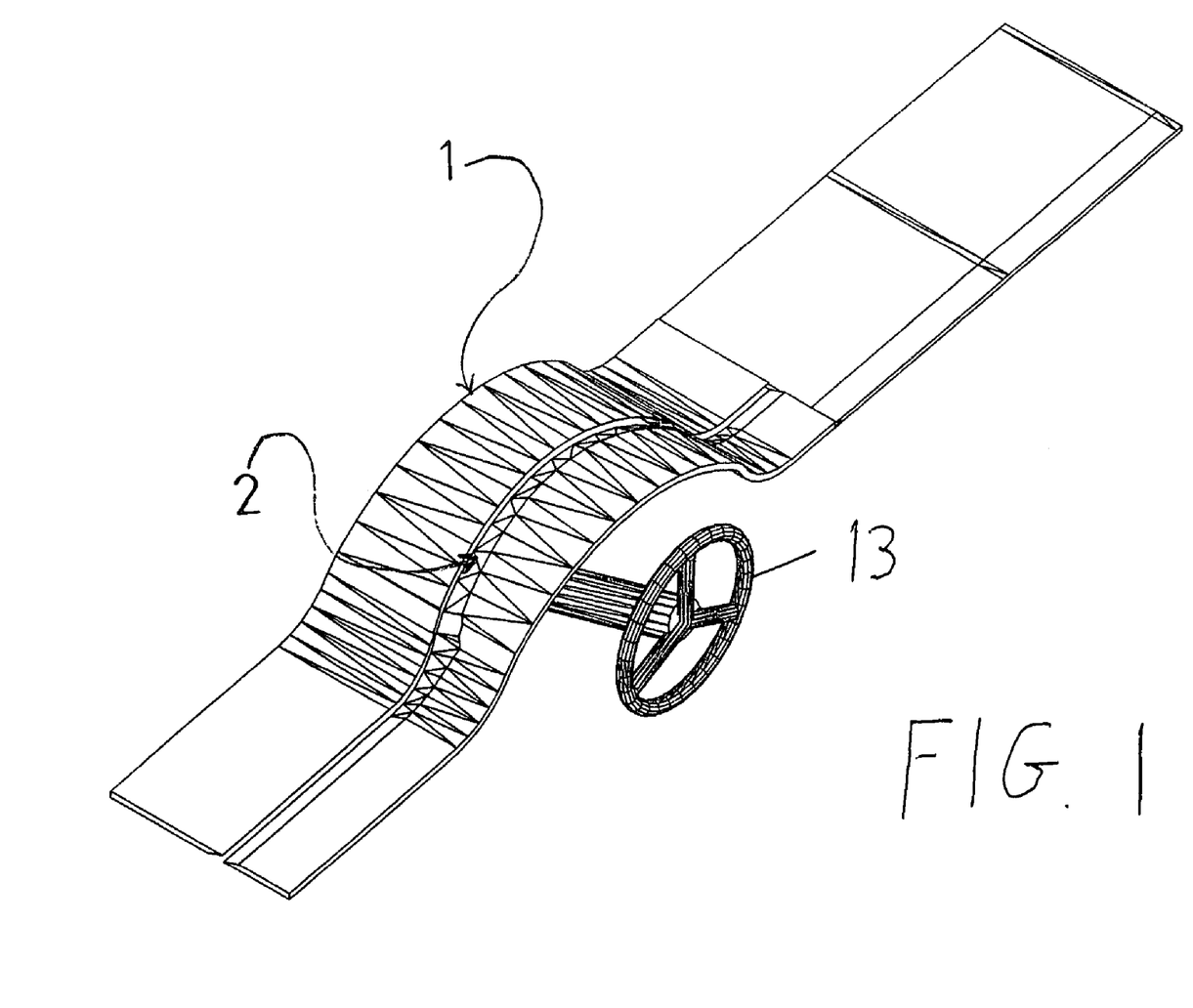
FIG. 1 is a left view that shows the dashboard and the shader slot on the dashboard.

FIG. 1 shows a shader slot 2 on the dashboard 1 that enables a shader to travel in and out at the dashboard surface. The slot 2 can be provided anywhere on the dashboard 1, depending on the dashboard design.

Figure 2:
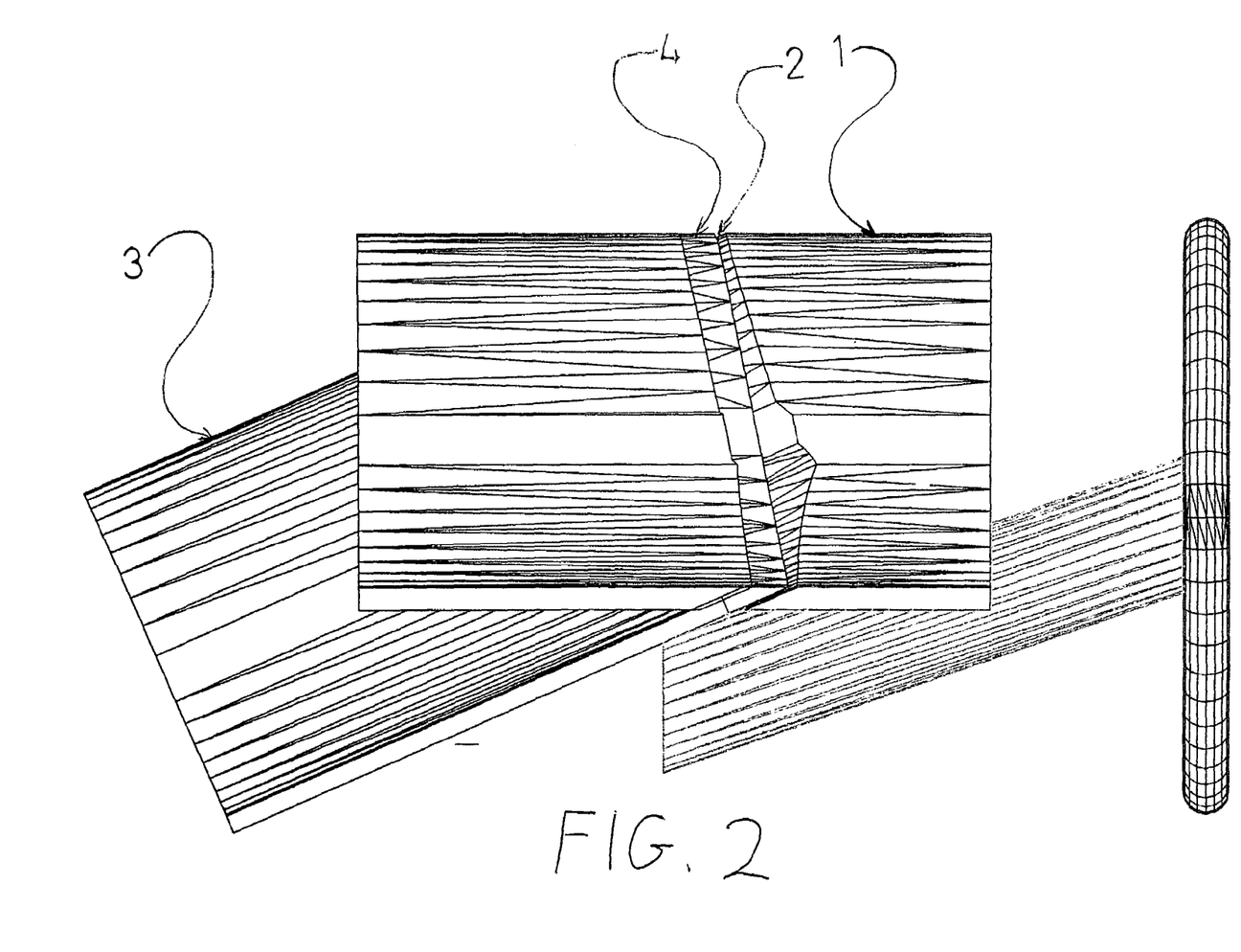
FIG. 2 is a left view that shows the pull out shader not pulled out.

FIG. 2 shows a left view of a first embodiment of the invention comprising a pull out shader 3 shown when not pulled out. In this position the pull out shader crown 4 stays flat to the surface of the dashboard 1.

Figure 3:
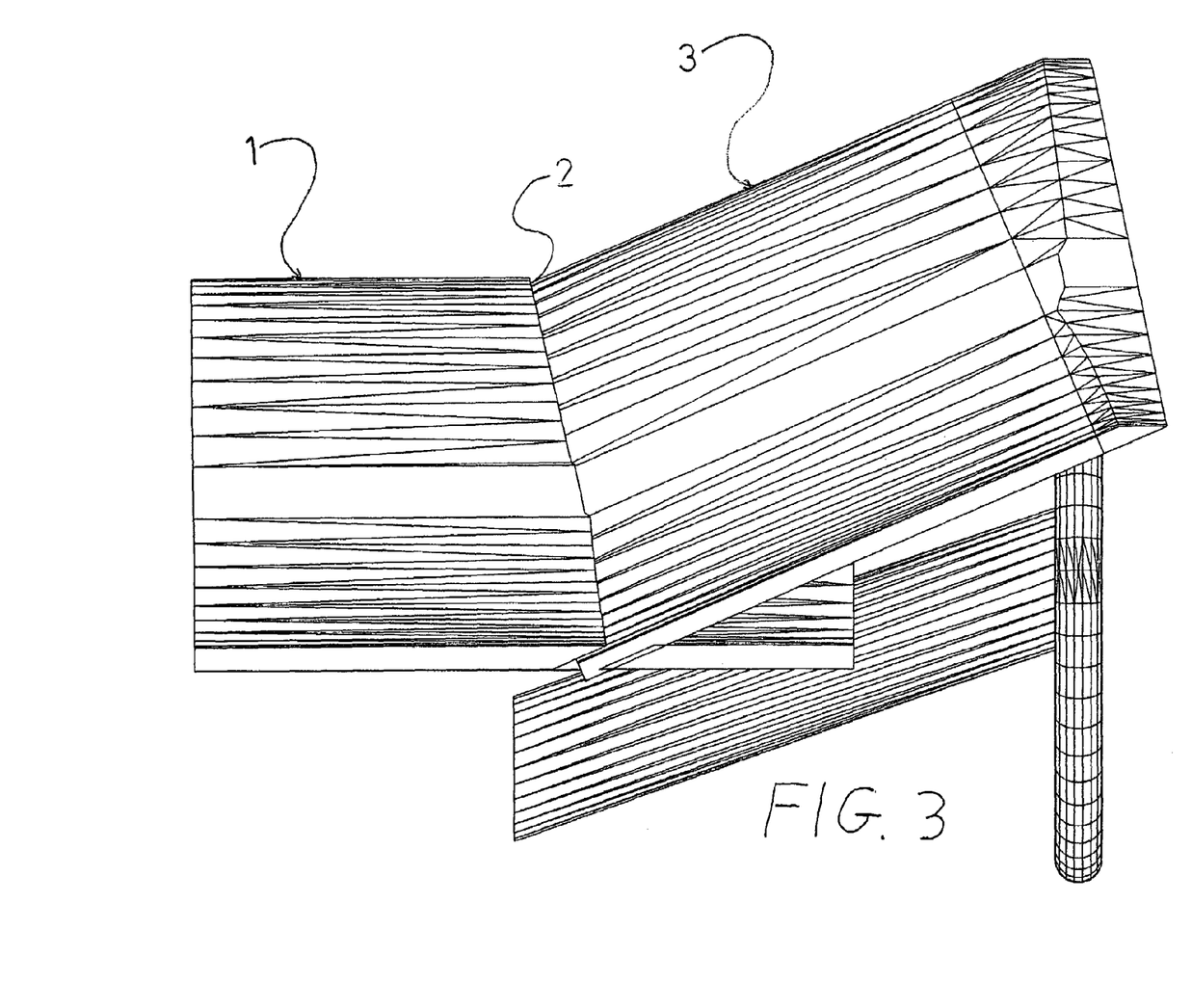
FIG. 3 is a left view of the pull out shader been pulled out to its maximum extent, covering the steering wheel to give shade for the driver's hands.

FIG. 3 shows a left view of the pull out shader 3, in which it has been pulled out to its maximum extent, to extend over the steering wheel 13 to give shade for the drivers hands. The pull out shader 3 repels the heat more efficiently than the dashboard 1 because of its lesser angle to the vertical than the dashboard.

Figure 4:
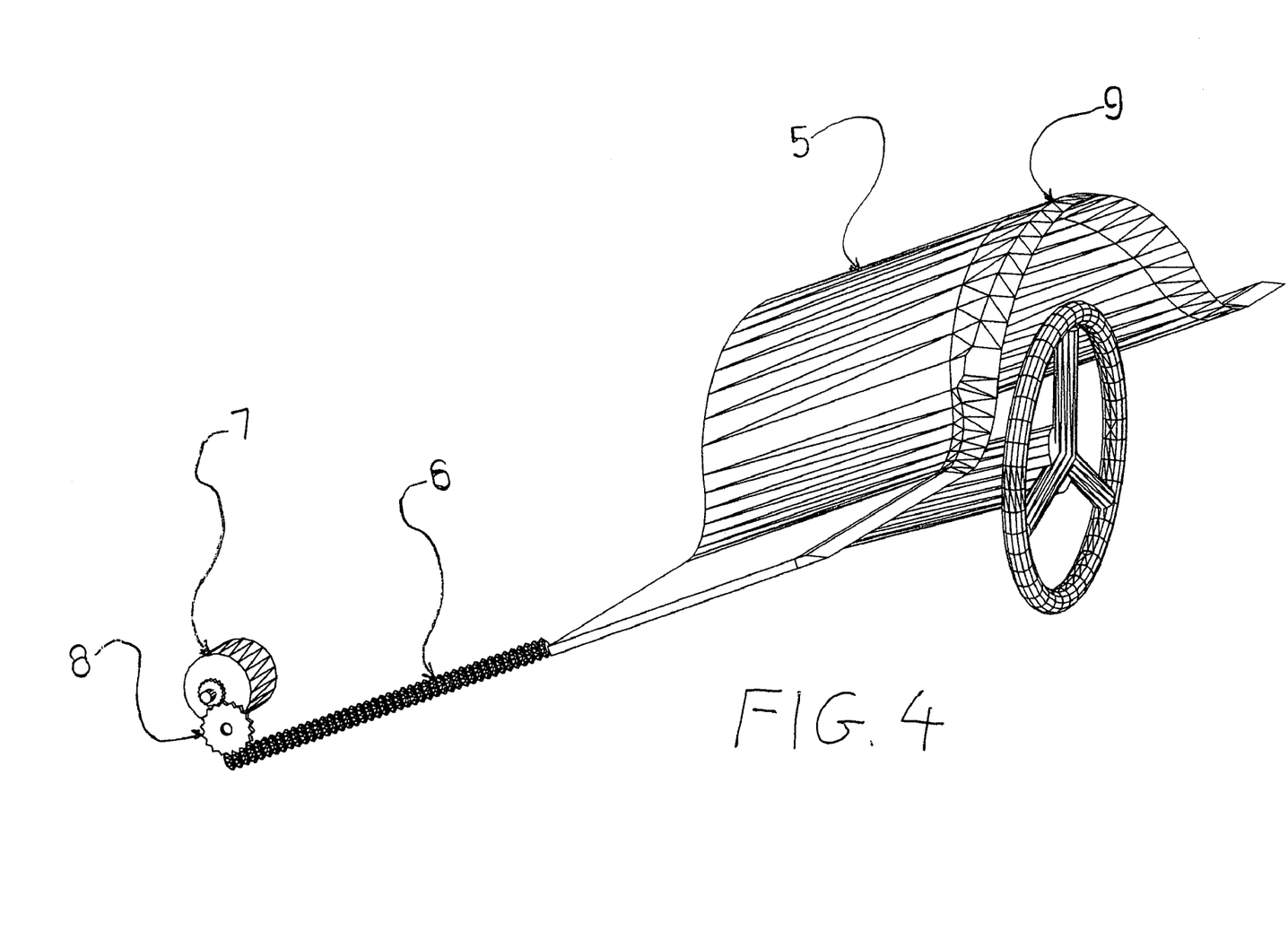
FIG. 4 is an isometric view of the power driven shader relative to the steering wheel, with other parts omitted for clarity.

According to another embodiment of the invention a power driven shader 5 may be driven out towards the driver by a motor 7. FIG. 4 is an isometric view of the power driven shader 5, showing the power driven shader 5 in relation to the steering wheel, other parts of the apparatus being omitted for clarity. The motor 7 drives the drive gear 8, that drives the power driven shader screw 6 up and down which makes the power driven shader 5 travel in and out of the dashboard. When the driver wants shade the drive gear 8 will drive the screw 6 out, driving the shader 5 out to its maximum extent to give shade.

Figure 5:
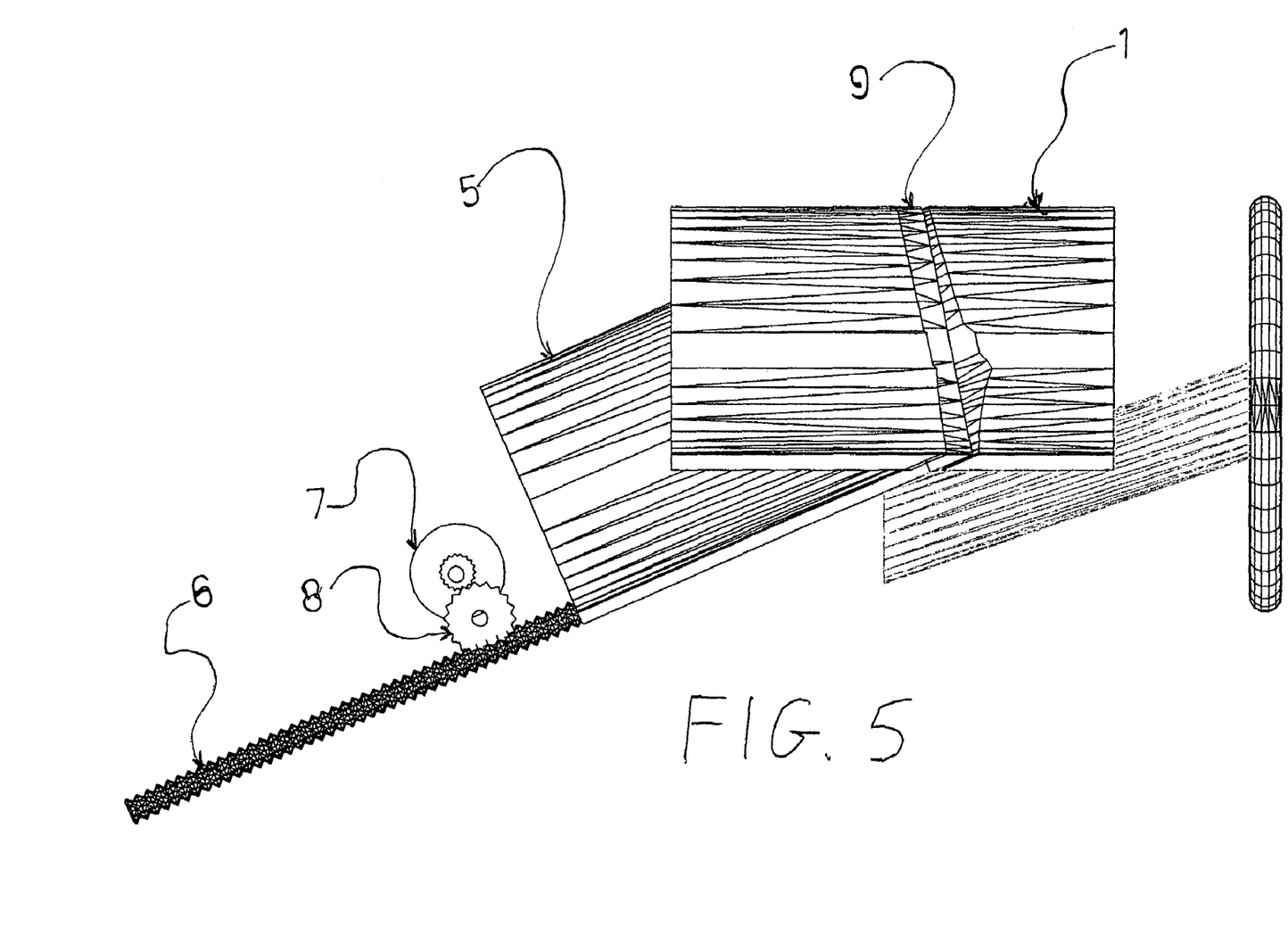
FIG. 5. is a left view of the power driven shader when not extended.
Figure 6:
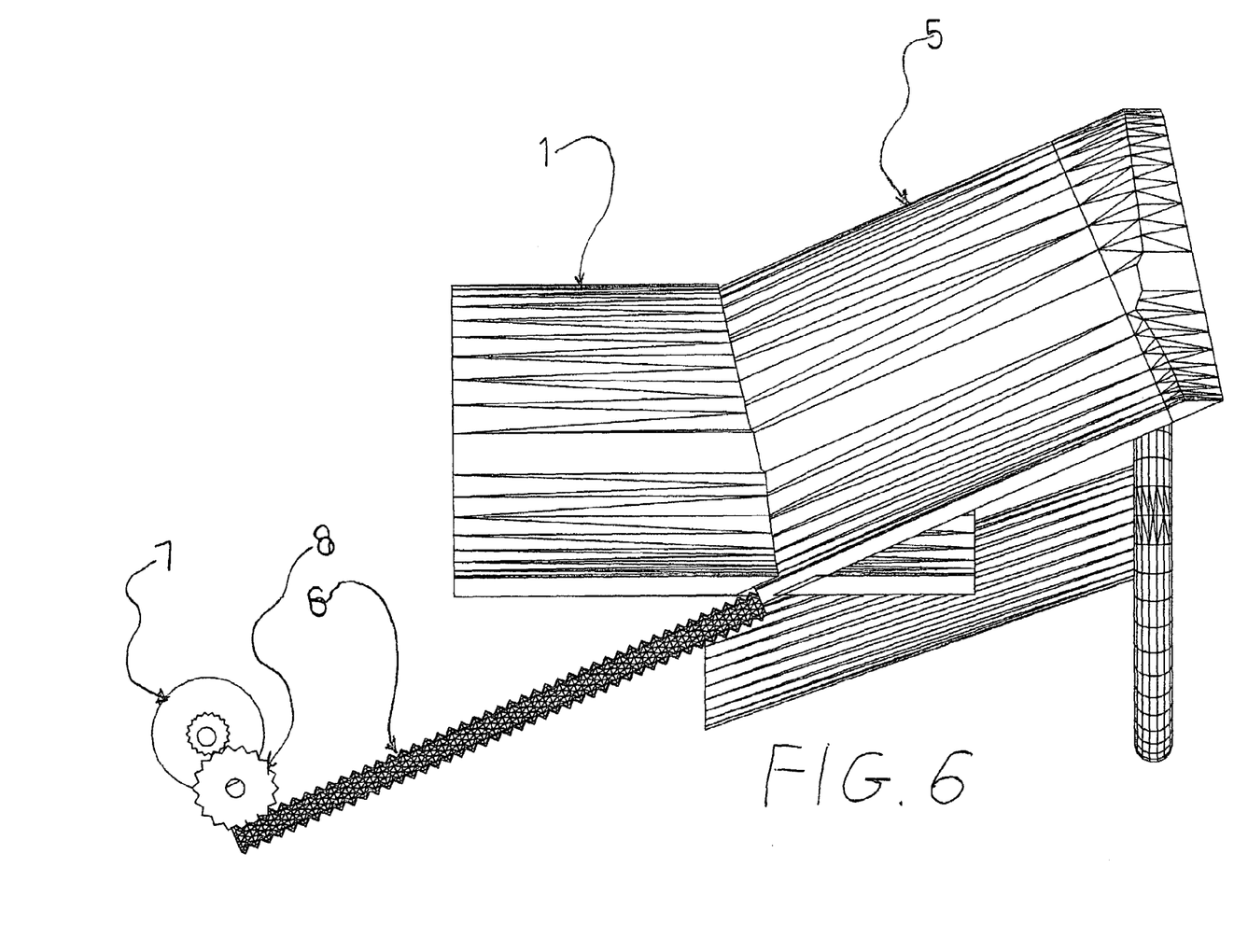
FIG. 6. is a left view of the power driven shader when fully extended.
Figure 7:
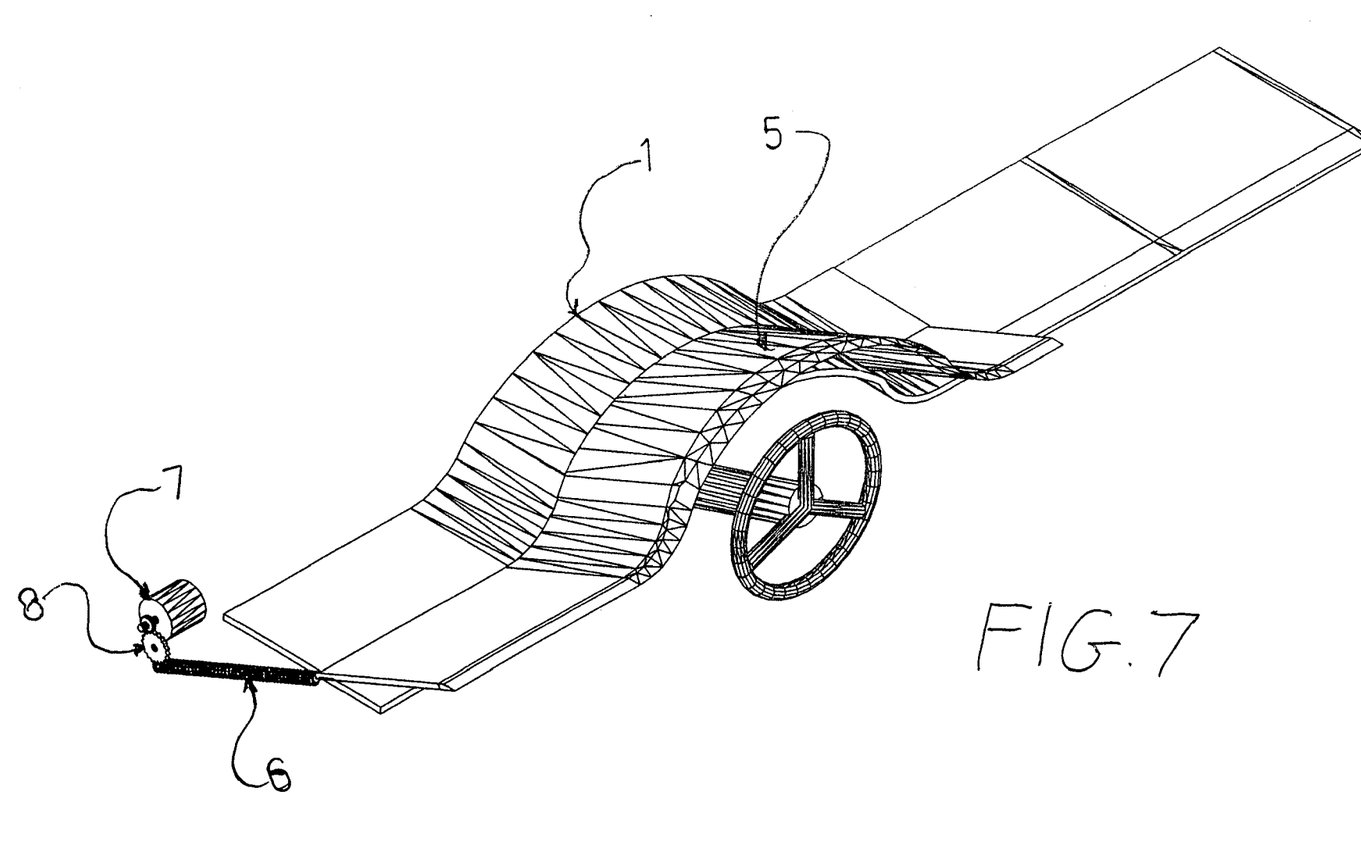
FIG. 7. is an isometric view of the power driven shader.

FIG. 5 is a left view of the power driven shader 5, where the crown 9 stays flat to the dashboard 1, FIG. 6 is a left view of the power driven shader 5, where the power driven shader 5 is driven out for shade, and FIG. 7 is an isometric view of the power driven shader 5.

Figure 8:
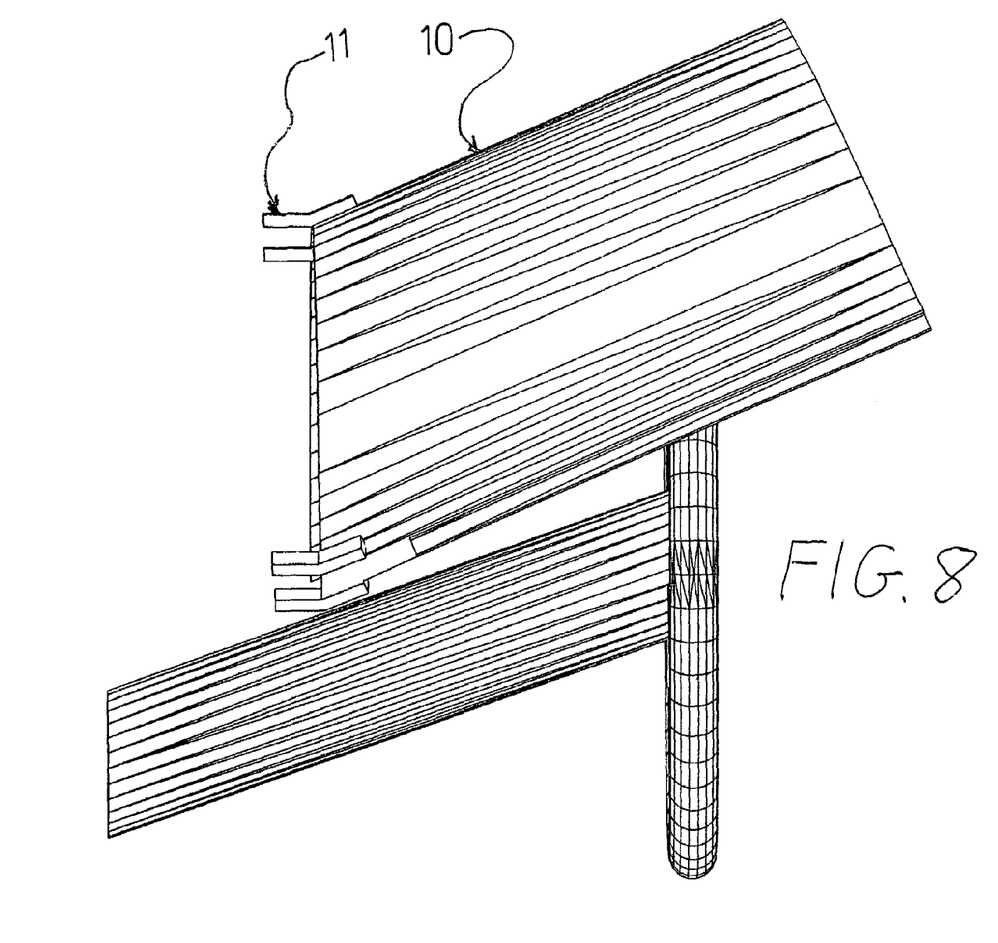
FIG. 8. is a left view of the clip on shader.
Figure 9:
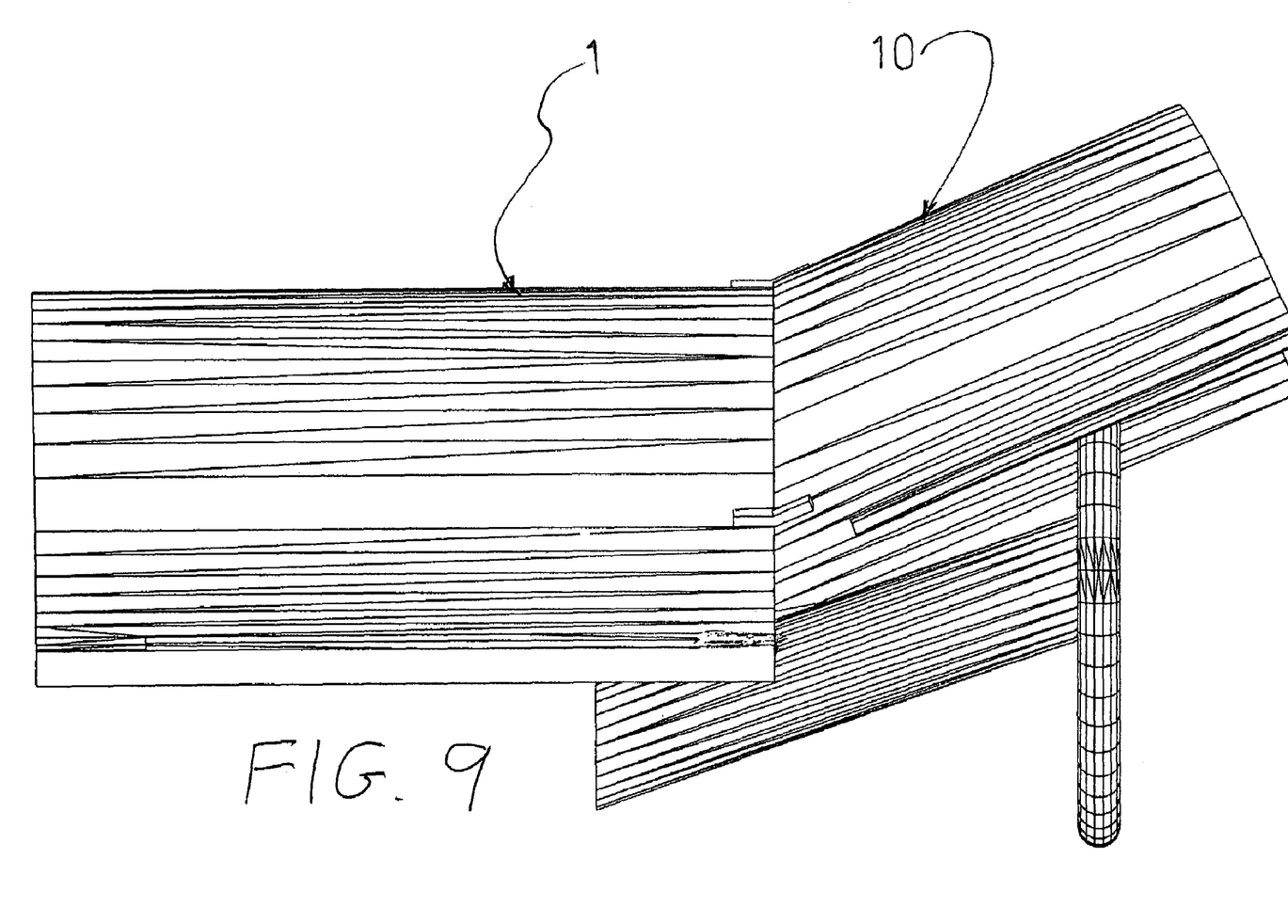
FIG. 9. is a left view of clip on shader clipped onto the dashboard for shade.

FIG. 8 is a left view of yet another embodiment of the invention comprising a clip on shader 10. The clip on shader 10 is shown in FIG. 8 in relation to the steering wheel, with other parts of the apparatus omitted for clarity. The clip on shader 10 is clipped onto the dashboard 1 for shade by means of clips 11. Clip on shader 10 may be inflatable for ease of stowing. FIG. 9 shows a view of the clip on shader 10 clipped onto the dashboard 1 for shade.

Figure 10:
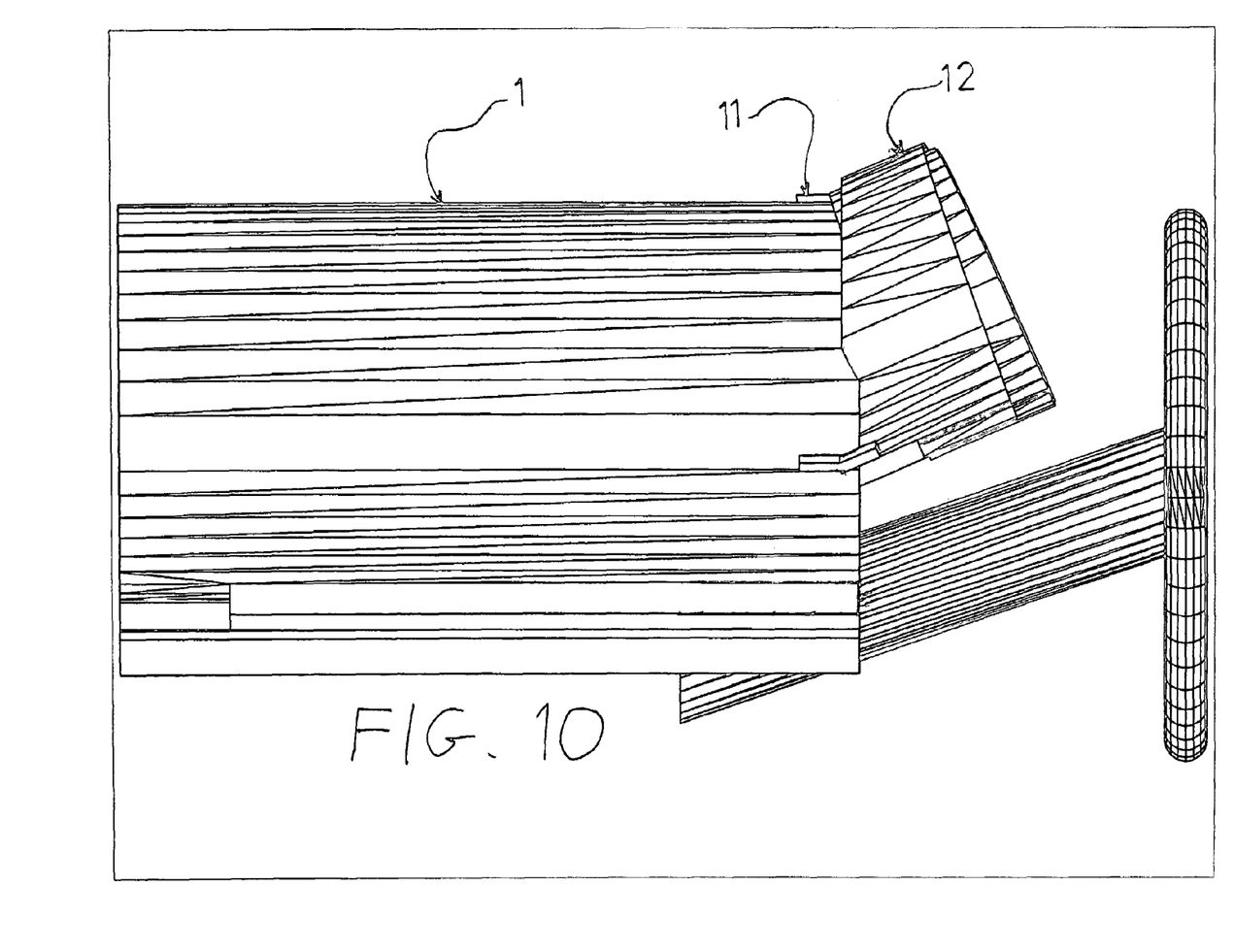
FIG. 10. is a left view of the telescopic type clip on shader when not extended.
Figure 11:
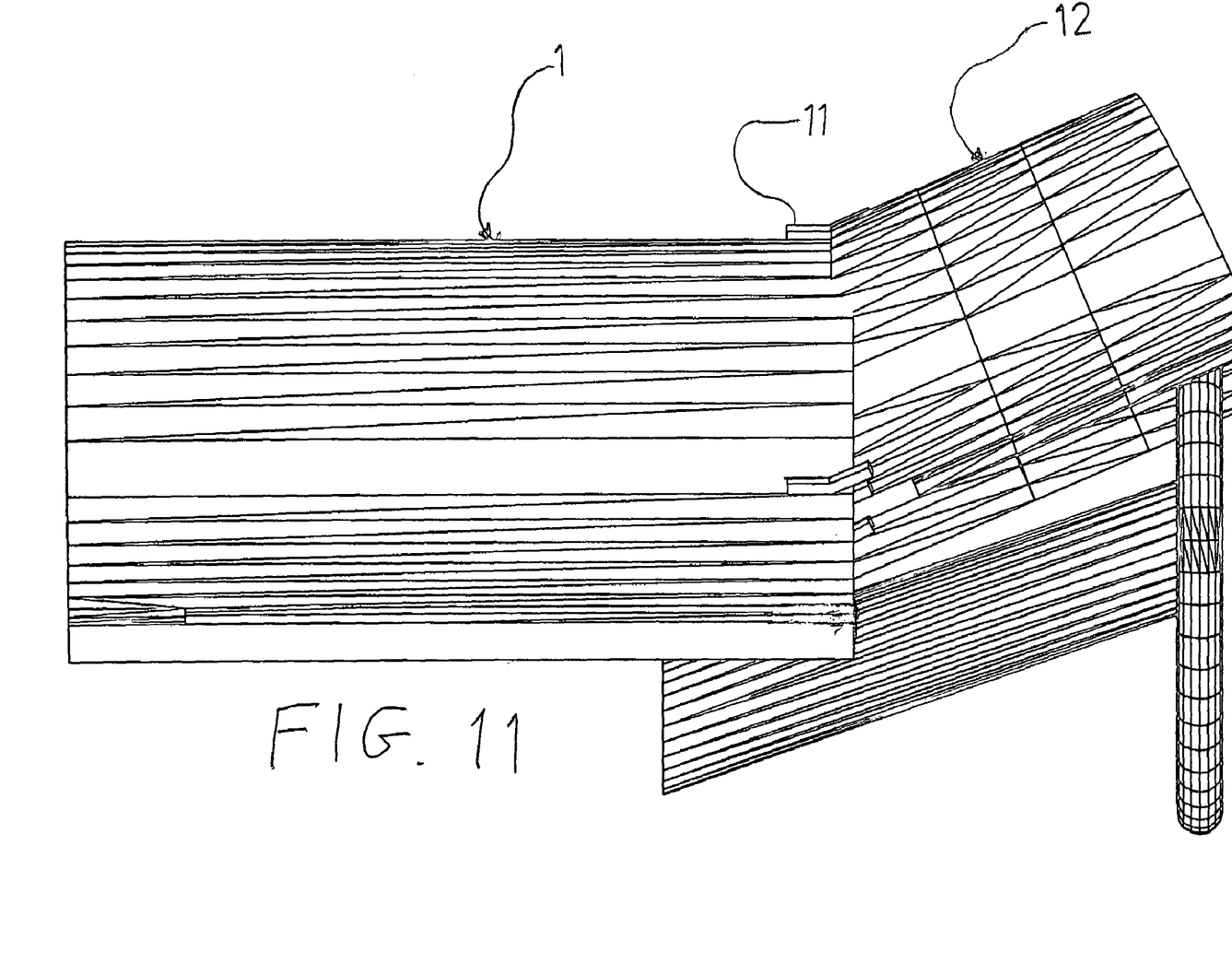
FIG. 11. is a left view of the telescopic type clip on shader when fully extended.

FIG. 10 is a left view of a telescopic type clip on shader 12 according a still further embodiment of the invention. The telescopic type clip on shader 12 is not extended for shade in FIG. 10. FIG. 11 is a left view of the telescopic type clip on shader 12 of FIG. 10 fully extended for shade.

As will readily be appreciated by those skilled in the art, numerous modifications and variations of the above embodiments of the present invention are possible without departing from the scope of the invention.

I claim:

1. An apparatus configured to give shade to a vehicle occupant, comprising:
a shade member substantially shaped as a vault and configured to be movable from a first position within a dashboard through a slot to a second position arched over a steering wheel.

2. The apparatus according to claim 1, further comprising: a motor configured to drive said shade member from said first position into said second position and from said second position into said first position.

3. The apparatus according to claim 2, further comprising: a toothed driven member configured to drive said shade member; and a toothed drive member cooperating with said toothed driven member; said motor configured to drive said toothed drive member.

4. The apparatus according to claim 1, wherein: said shade member has substantially linear transverse extensions.

5. An apparatus configured to give shade to a vehicle occupant, comprising: a shade member substantially shaped as a vault and configured to be driven towards said vehicle occupant, and a drive device, said shade member configured to be retracted into a slot in a dashboard in a first position and to extend out of said dashboard slot in a second position.

6. The apparatus according to claim 5, further comprising: said drive device comprises a motor configured to drive said shade member out of said dashboard and to retract said shade member into said dashboard.

7. The apparatus according to claim 6, further comprising: a toothed driven member configured to drive said shade member; and a toothed drive member cooperating with said toothed driven member; said motor configured to drive said toothed drive member.

8. The apparatus according to claim 5, wherein: said shade member is configured to arch over a steering wheel.

9. An apparatus configured to give shade to a vehicle occupant, comprising:
a telescopic shade member substantially shaped as a vault and clipped to a dashboard.

10. The apparatus according to claim 9, wherein: said shade member is telescopic in a direction towards said vehicle occupant.

* * * * *